(12) United States Patent
Sharma et al.

(10) Patent No.: US 10,857,397 B2
(45) Date of Patent: Dec. 8, 2020

(54) BAYONET HOSE CONNECTOR ASSEMBLY MECHANISM IN POWERED AIR PURIFYING AIR RESPIRATOR HOUSING

(71) Applicant: Honeywell International Inc., Morris Plains, NJ (US)

(72) Inventors: Devendra Sharma, Hyderabad (IN); Bharat Bhushan Arora, Ambala (IN); Durgam Gangadhar, Hyderabad (IN)

(73) Assignee: Honeywell International Inc., Morris Plains, NJ (US)

( * ) Notice: Subject to any disclaimer, the term of this patent is extended or adjusted under 35 U.S.C. 154(b) by 431 days.

(21) Appl. No.: 15/660,614

(22) Filed: Jul. 26, 2017

(65) Prior Publication Data
US 2019/0030377 A1    Jan. 31, 2019

(51) Int. Cl.
*A62B 9/04* (2006.01)
*A62B 18/00* (2006.01)
*F16B 21/04* (2006.01)
*A62B 7/10* (2006.01)

(52) U.S. Cl.
CPC .............. *A62B 9/04* (2013.01); *A62B 7/10* (2013.01); *A62B 18/006* (2013.01); *F16B 21/04* (2013.01)

(58) Field of Classification Search
CPC .. A62B 9/04; A62B 7/10; A62B 18/04; A62B 18/08; A62B 3/00; A62B 3/02; F16B 21/04; F16B 7/20; F16B 5/10; F16B 21/02; F16B 21/09; Y10T 403/7007; B23B 31/113; F21V 17/14; A61M 16/08; A61M 16/0816; A61M 39/10; A61M 2039/1033; A61M 16/0066; A61M 16/16; A61M 39/1011
See application file for complete search history.

(56) References Cited

U.S. PATENT DOCUMENTS 3,990,727 A * 11/1976 Gallagher ............. F16L 37/084
                                                                285/26
6,086,561 A *  7/2000 Kriesel ................. A61M 5/152
                                                                604/133
(Continued)

FOREIGN PATENT DOCUMENTS

EP       2322249 A1    5/2011
GB       2151323 A     7/1985
(Continued)

OTHER PUBLICATIONS

Europe Patent Application No. 18185081.9, Extended European Search Report, dated Nov. 22, 2018, 7 pages.

*Primary Examiner* — Kendra D Carter
*Assistant Examiner* — Thao Tran
(74) *Attorney, Agent, or Firm* — Alston & Bird LLP

(57) ABSTRACT

Embodiments relate generally to a connector for a powered air-purifying respirator ("PAPR"). A powered air purifying respirator (PAPR) connector may comprise a tab extending from the PAPR connector, wherein the tab is positioned to contact an inner surface of a housing; and a flange extending from the PAPR connector, wherein the flange is configured to receive an attachment mechanism, wherein the attachment mechanism is configured to attach the PAPR connector to the housing; wherein the PAPR connector is rotatable within the housing.

15 Claims, 3 Drawing Sheets

(56) References Cited

U.S. PATENT DOCUMENTS

| | | | | |
|---|---|---|---|---|
| 6,189,568 B1* | 2/2001 | Bergum | ............... | F16K 27/003 |
| | | | | 137/315.01 |
| 6,575,165 B1* | 6/2003 | Cook | ..................... | A62B 9/006 |
| | | | | 128/205.12 |
| 8,667,959 B2 | 3/2014 | Tilley et al. | | |
| 2005/0145249 A1 | 7/2005 | Solyntjes et al. | | |
| 2012/0169044 A1* | 7/2012 | Kendrick | ............... | F16L 37/08 |
| | | | | 285/313 |
| 2012/0284991 A1* | 11/2012 | Kusz | ..................... | C12M 23/14 |
| | | | | 29/428 |
| 2014/0034049 A1* | 2/2014 | Castiglione | .............. | A62B 9/04 |
| | | | | 128/202.27 |
| 2015/0032089 A1* | 1/2015 | Way | ................... | A61M 39/1011 |
| | | | | 604/535 |
| 2015/0128944 A1* | 5/2015 | Buechi | .................. | A61M 16/16 |
| | | | | 128/203.27 |
| 2015/0306366 A1* | 10/2015 | Lewis | .................. | F16L 37/248 |
| | | | | 604/535 |
| 2016/0354288 A1* | 12/2016 | Uehara | ................ | A61M 39/12 |

FOREIGN PATENT DOCUMENTS

| | | |
|---|---|---|
| WO | 0211815 A1 | 2/2002 |
| WO | 2016157101 A1 | 10/2016 |

\* cited by examiner

BAYONET HOSE CONNECTOR ASSEMBLY MECHANISM IN POWERED AIR PURIFYING AIR RESPIRATOR HOUSING

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Powered air purifying respirators ("PAPRs") may utilize a mechanism, such as a blower, impeller, fan or other mechanism, to draw ambient air through air purifying elements to remove contaminants from the air. PAPRs may be portable and may be used to provide a useable and safe supply of breathable air in environments with solid, liquid, and/or gaseous contaminants.

SUMMARY

In an embodiment, a powered air purifying respirator (PAPR) connector may comprise a tab extending from the PAPR connector, wherein the tab is positioned to contact an inner surface of a housing; and a flange extending from the PAPR connector, wherein the flange is configured to receive an attachment mechanism, wherein the attachment mechanism is configured to attach the PAPR connector to the housing; wherein the PAPR connector is rotatable within the housing.

In an embodiment, a powered air purifying respirator (PAPR) system may comprise a housing comprising a PAPR blower and a connector mount; and a PAPR connector comprising: a tab extending from the PAPR connector, wherein the tab is positioned to contact an inner surface of the housing; and a flange extending from the PAPR connector, wherein the flange is configured to receive an attachment mechanism, wherein the attachment mechanism is configured to attach the PAPR connector to the housing; wherein the PAPR connector is rotatable within the housing.

In an embodiment, a method for connecting a powered air purifying respirator (PAPR) connector to a housing, may comprise aligning a tab of the PAPR connector with a slot of the housing; inserting the PAPR connector into the housing; rotating the PAPR connector within the housing; aligning a flange of the PAPR connector with a receptacle of the housing; inserting an attachment mechanism through the flange and the receptacle; and securing the PAPR connector to the housing.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1A:
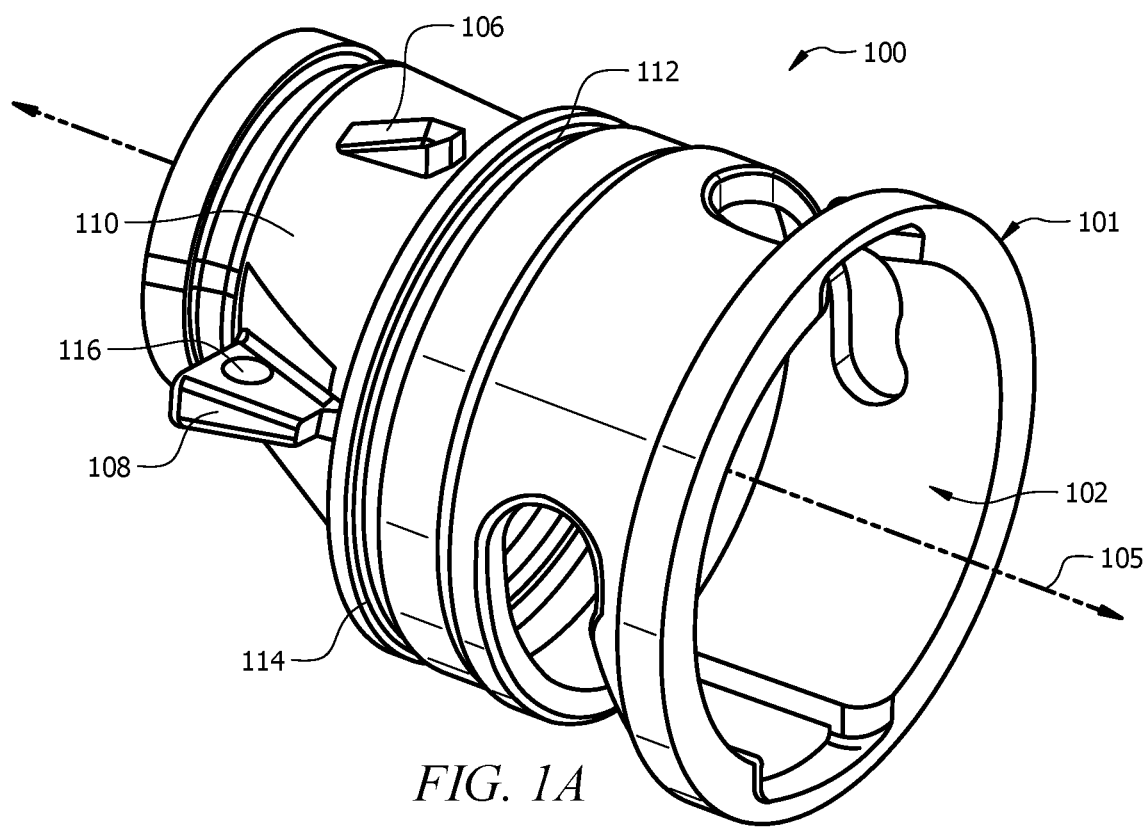
FIGS. 1A and 1B are schematic illustrations of a PAPR connector in accordance with embodiments of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The following brief definition of terms shall apply throughout the application:

The term "comprising" means including but not limited to, and should be interpreted in the manner it is typically used in the patent context;

The phrases "in one embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment);

If the specification describes something as "exemplary" or an "example," it should be understood that refers to a non-exclusive example;

The terms "about" or "approximately" or the like, when used with a number, may mean that specific number, or alternatively, a range in proximity to the specific number, as understood by persons of skill in the art field; and If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

Embodiments of the disclosure may relate to a PAPR connector for attaching a flow line to a housing (e.g., PAPR blower unit). Conventionally, the connector may comprise a threaded joint and/or a bayonet system. Generally, creating threaded joints within the connector may be a complex process requiring additional tooling. Threaded joints may secure a flow line (e.g., hose, pipe, conduit) to the housing; however, improper cross-threading and/or insufficient tightness of the flow line to the housing (e.g., if the user does not securely thread the flow line to the housing) may prevent the PAPR from operating properly. In some cases, threaded joints may cause air leakage and may prevent the PAPR from functioning effectively. Alternatively, a bayonet system may use an accessory, making it more difficult to securely attach the flow line to the housing. Conventionally, a bayonet system may be attached to a housing using adhesive and/or an accessory, such as, for example, a thermoplastic urethane ("TPU") part. The use of an accessory within a conventional bayonet system may require more assembly time and may increase manufacturing costs. Therefore, disclosed embodiments may relate to a connection mechanism which may decrease assembly time and manufacturing cost, and may provide a secure connection between the housing and the flow line.

Disclosed embodiments may comprise a connection mechanism having a bayonet profile. A bayonet profile may use a rotational turn to attach the connector to the housing. The connector may include a first end including a first opening, and may be positioned inside of the housing. The connector may also include a second end comprising a second opening, and may be connected (e.g., fit onto/into) to a flow line (in order to deliver breathable air/gas to the user). The connector may be hollow to allow continuous flow of air/gas from the first end to the second end, and/or vice versa. Additionally, the connector may be of a tubular/cylindrical shape.

The connector may further comprise at least one tab and/or at least one flange. In some embodiments, the flange may be configured to contact/abut a receptacle located within the housing. The tab(s) may be located on and extend outward from an outer surface of the connector. The tab(s) may be positioned against a rim located inside the housing. When the connector is rotated in a counter-clockwise or clockwise direction, a flange may contact a receptacle of the housing. In some embodiments, an attachment mechanism may be used to secure the connector to the housing. The attachment mechanism, for example, may comprise a screw, bolt, or rod, which may be inserted through the flange and the receptacle. The attachment mechanism may secure the connector to the housing such that the connector withstands large amounts of force, for example, forces up to 250 Newtons ("N").

In some embodiments, the receptacle may be formed as a projection, or the receptacle may be inset within a surface of the housing (e.g., the receptacle may lie flush with an inner surface of the housing). The receptacle may be configured to mate with the flange. Additionally, the receptacle may serve as a stopping point for the connector. In other words, the connector may not rotate further once the flange contacts the receptacle.

In some embodiments, the connector may further comprise a gasket such as an O-ring. The O-ring may provide a seal between the connector and the housing, and may prevent a leakage of air/gas from the housing by maintaining pressure.

Figure 1B:
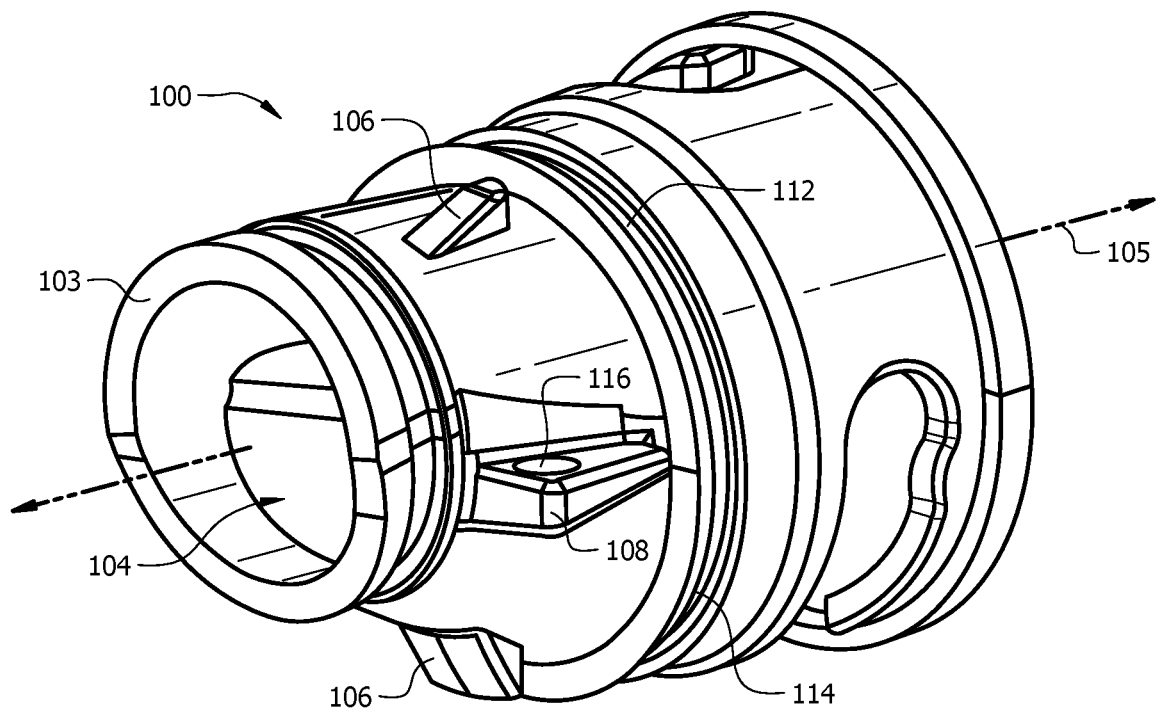

FIGS. 1A and 1B illustrate a PAPR connector 100. PAPR connector 100 may be hollow and of a tubular/cylindrical shape with a first end 101 including opening 102 and a second end 103 including opening 104. First end 101, opening 102, second end 103, and opening 104 may be of any suitable shape, such as, for example, a circle. Opening 102 and opening 104 may allow air/gas to flow through the PAPR connector 100. First end 101 may be connected to a flow line (e.g., conduit, pipe, hose, etc.). Second end 103 may be positioned within a housing (e.g., a PAPR blower). First end 101 may include a diameter (e.g., relative to a longitudinal axis 105 of PAPR connector 100) that may be greater than a diameter (e.g., relative to a longitudinal axis 105 of PAPR connector 100) of second end 103. PAPR connector 100 may include at least one tab 106 extending outward (e.g., extending radially from a longitudinal axis 105 of PAPR connector 100) from PAPR connector 100. PAPR connector 100 may also include flange 108 extending outward from PAPR connector 100. Tab 106 and flange 108 may be positioned at a distal end of connector 100 relative to first end 101. Tab 106 may be positioned at 45° through 90° from flange 108 along a circumference of portion 110 of PAPR connector 100. PAPR connector 100 may also include groove 112 extending circumferentially about PAPR connector 100. A gasket 114 may be positioned within groove 112 to prevent air/gas leaks (i.e., gasket 114 may be a pressure seal) from the PAPR connector 100. Flange 108 may include aperture 116 for receiving an attachment mechanism. In certain embodiments, PAPR connector 100 may include a plurality of tabs 106. Additional tabs 106 may provide additional reinforcement for securing PAPR connector 100 to the housing 120 (shown on FIG. 2). PAPR connector 100 may be detachable from a flow line (e.g., flow line 122 shown on FIG. 2) and a housing (e.g., housing 120 shown on FIG. 2).

Figure 2:
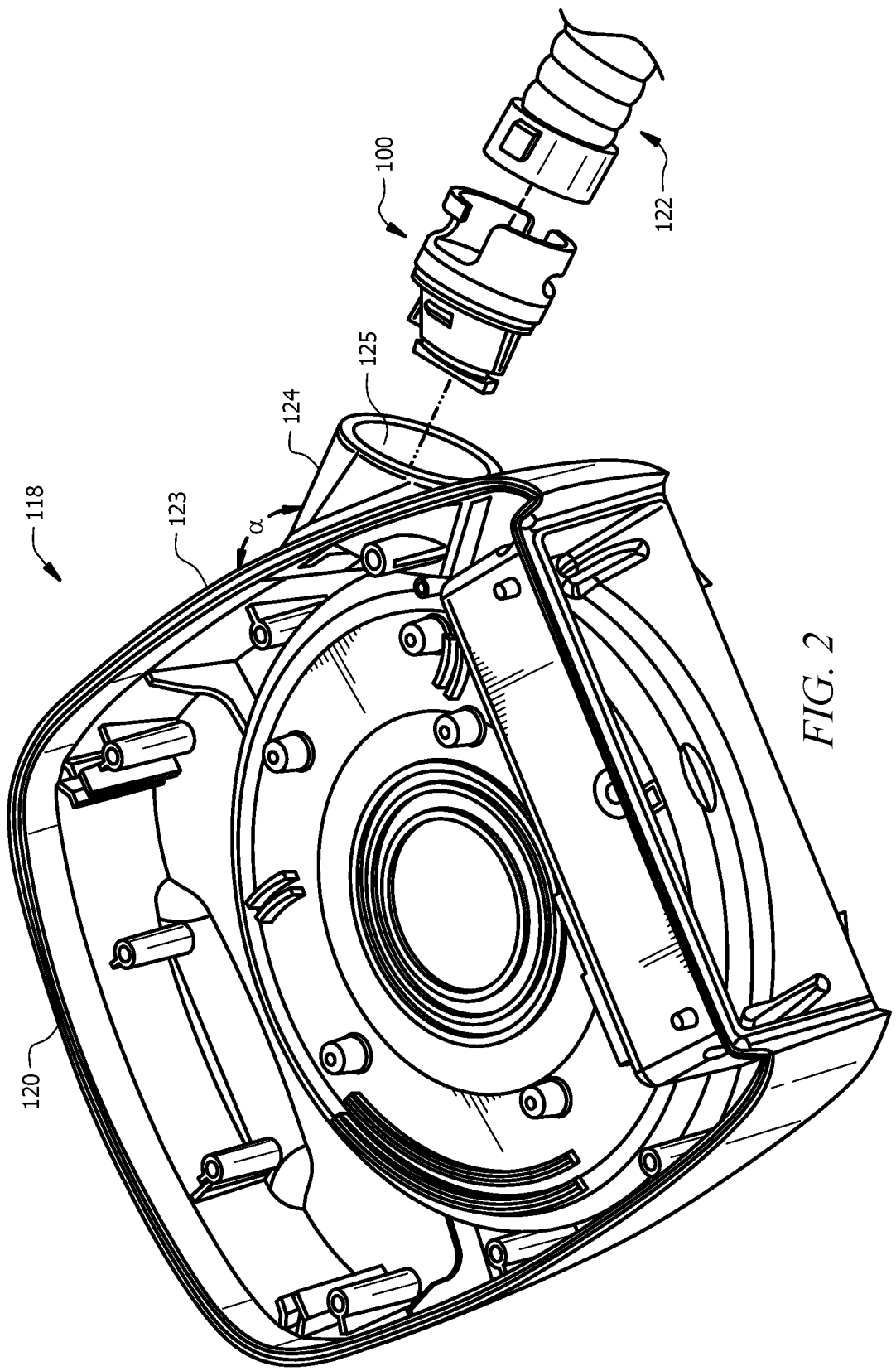
FIG. 2 is a schematic illustration of a PAPR system in accordance with embodiments of the disclosure.

FIG. 2 illustrates a PAPR system 118. PAPR system 118 may include housing 120 and PAPR connector 100. Housing 120 may include, for example, a PAPR blower. In certain embodiments, PAPR system 118 may further include a flow line 122 (e.g., a hose, pipe, conduit, etc.) which may be attachable to/detachable from PAPR connector 100. One end of flow line 122 may be attached to a mask/head unit worn by a user. Housing 120 may include connection port 124. PAPR connector 100 may be inserted into housing 120 via connection port 124 and passage 125. Connection port 124 may be located at an angle, a, relative to a side wall 123 of the housing 120. The angle may be chosen to improve connectivity/attachment of the flow line 122 to the housing 120. Connection port 124 may include passage 125 which may extend into housing 120. Rim 129 (i.e., an inner surface of housing 120, shown on FIGS. 3A and 3B) may extend circumferentially about passage 125 within housing 120.

Figure 3A:
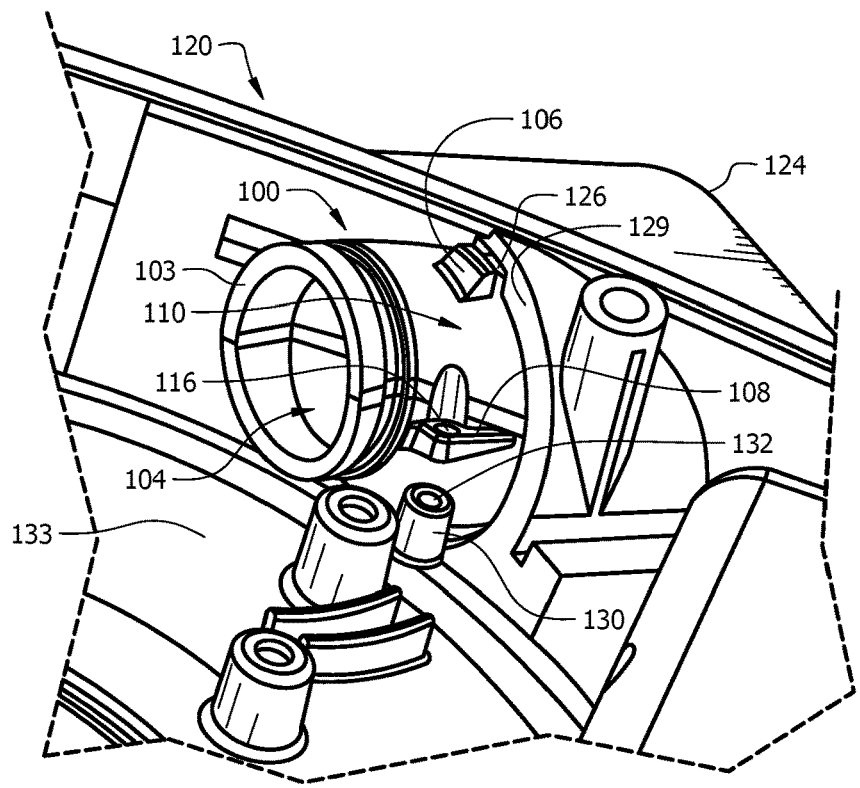
FIGS. 3A and 3B are schematic illustrations of a housing receiving a PAPR connector in accordance with embodiments of the disclosure.
Figure 3B:
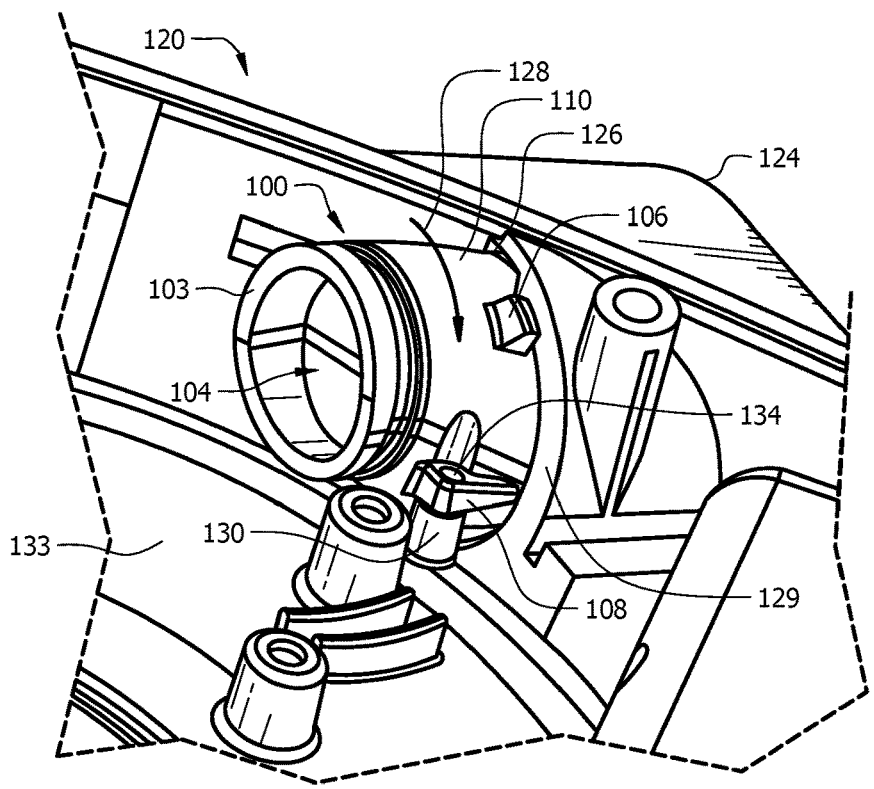

FIGS. 3A and 3B illustrate PAPR connector 100 positioned within housing 120. Second end 103 may be inserted into connection port 124, then tab 106 may be aligned with slot 126, and then PAPR connector 100 may be inserted into housing 120. Once inserted into housing 120, PAPR connector 100 may be rotated (e.g., depicted by arrow 128) 45° through 90°, thereby securing/positioning tab 106 against rim 129 and aligning aperture 116/flange 108 with receptacle 130/opening 132. That is, housing 120 may include (within its interior) receptacle 130 which includes opening 132. Once aligned, an attachment mechanism 134, such as, for example, a screw, bolt, rod, etc., may be inserted through aperture 116 and opening 132, thereby securing PAPR connector 100 to housing 120. The combination of tab 106 and flange 108 may allow PAPR connector 100 to be secured to housing 120. That is, tab 106 is configured to secure PAPR connector 100 within housing 120 because once tab 106 is rotated with PAPR connector 100, PAPR connector 100 cannot be removed from the housing 120 unless it is aligned with slot 126 and attachment mechanism 134 is removed. In some embodiments, receptacle 130 may lie flush with an inner surface 133 of the housing 120. In other embodiments, receptacle 130 may be a protrusion extending outward from an inner surface 133 of the housing 120.

With reference to FIGS. 1A-3B, operation of PAPR connector 100 may be described as follows. PAPR connector 100 may be inserted into connection port 124 via passage 125. Tab 106 of PAPR connector 100 may be aligned with slot 126 of housing 120. Once aligned, PAPR connector 100 may be inserted into housing 120. Once inserted into housing 120, PAPR connector 100 may be rotated to align aperture 116 of flange 108 with opening 132 of receptacle 130 of housing 120. Once aligned, attachment mechanism 134 may be inserted through aperture 116/flange 108 and opening 132/receptacle 130, thereby securing PAPR connector 100 to housing 120. The tab 106, once rotated, does not allow PAPR connector 100 to be removed from housing 120 because tab 106 is no longer aligned with slot 126 of housing 120. That is, tab 106, once rotated, prevents PAPR connector from being removed from the housing 120. Once PAPR connector 100 is secured into housing 120, flow line 122 may be connected/attached to PAPR connector 100.

Benefits of devices, systems, and methods of the disclosure may include 1) no adhesive is required for securing the PAPR connector within the housing; 2) the PAPR connector may withstand up to 250 N of pull out force; 3) the PAPR connector is fastened with at least one tab and an attachment mechanism such as a screw, bolt, rod, etc.; 4) the PAPR connector includes a rigid and secure design.

Having described various systems, devices, and methods, various embodiments may include, but are not limited to:

In a first embodiment, a powered air purifying respirator (PAPR) connector may comprise a tab extending from the PAPR connector, wherein the tab is positioned to contact an inner surface of a housing; and a flange extending from the PAPR connector, wherein the flange is configured to receive an attachment mechanism, wherein the attachment mechanism is configured to attach the PAPR connector to the housing; wherein the PAPR connector is rotatable within the housing.

A second embodiment may include the PAPR connector of the first embodiment, further comprising a groove extending about a circumference of the PAPR connector.

A third embodiment may include the PAPR connector of the first or second embodiment, further comprising a gasket positioned within the groove.

A fourth embodiment may include the PAPR connector of any of the preceding embodiments, wherein the attachment mechanism comprises a screw, a rod, or a bolt.

A fifth embodiment may include the PAPR connector of any of the preceding embodiments, wherein the attachment mechanism is positioned within the flange and a receptacle of the housing.

A sixth embodiment may include the PAPR connector of any of the preceding embodiments, wherein the gasket comprises an O-ring.

A seventh embodiment may include the PAPR connector of any of the preceding embodiments, wherein the PAPR connector is attachable to a flow line.

An eighth embodiment may include the PAPR connector of any of the preceding embodiments, wherein the PAPR connector is rotatable from 45° through 90°.

A ninth embodiment may include the PAPR connector of any of the preceding embodiments, wherein the PAPR connector is hollow.

A tenth embodiment may include the PAPR connector of any of the preceding embodiments, wherein the housing comprises a PAPR blower.

In an eleventh embodiment, a powered air purifying respirator (PAPR) system may comprise a housing comprising a PAPR blower and a connector mount; and a PAPR connector comprising: a tab extending from the PAPR connector, wherein the tab is positioned to contact an inner surface of the housing; and a flange extending from the PAPR connector, wherein the flange is configured to receive an attachment mechanism, wherein the attachment mechanism is configured to attach the PAPR connector to the housing; wherein the PAPR connector is rotatable within the housing.

A twelfth embodiment may include the PAPR system of the eleventh embodiment, further comprising a groove extending about a circumference of the PAPR connector.

A thirteenth embodiment may include the PAPR system of the eleventh or twelfth embodiment, further comprising a gasket positioned within the groove.

A fourteenth embodiment may include the PAPR system of any of the eleventh through thirteenth embodiments, wherein the attachment mechanism comprises a screw, a rod, or a bolt.

A fifteenth embodiment may include the PAPR system of any of the eleventh through fourteenth embodiments, wherein the attachment mechanism is positioned within the flange and a receptacle of the housing.

A sixteenth embodiment may include the PAPR system of any of the eleventh through fifteenth embodiments, wherein the PAPR connector is rotatable from 45° through 90°.

A seventeenth embodiment may include the PAPR system of any of the eleventh through sixteenth embodiments, further comprising a flow line, wherein the flow line is connected to the PAPR connector.

In an eighteenth embodiment, a method for connecting a powered air purifying respirator (PAPR) connector to a housing, may comprise aligning a tab of the PAPR connector with a slot of the housing; inserting the PAPR connector into the housing; rotating the PAPR connector within the housing; aligning a flange of the PAPR connector with a receptacle of the housing; inserting an attachment mechanism through the flange and the receptacle; and securing the PAPR connector to the housing.

A nineteenth embodiment may include the method of the eighteenth embodiment, further comprising connecting a flow line to the PAPR connector.

A twentieth embodiment may include the method of the eighteenth or nineteenth embodiment, wherein rotating the PAPR connector comprises rotating the PAPR connector in a range from 45° through 90°.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow that scope including all equivalents of the subject matter of the claims. Each and every claim is incorporated as further disclosure into the specification, and the claims are embodiment(s) of the present invention(s). Furthermore, any advantages and features described above may relate to specific embodiments, but shall not limit the application of such issued claims to processes and structures accomplishing any or all of the above advantages or having any or all of the above features.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure. Specifically and by way of example, although the headings might refer to a "Field," the claims should not be limited by the language chosen under this heading to describe the so-called field. Further, a description of a technology in the "Background" is not to be construed as an admission that certain technology is prior art to any invention(s) in this disclosure. Neither is the "Summary" to be considered as a limiting characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of the claims shall be considered on their own merits in light of this disclosure, but should not be constrained by the headings set forth herein.

Use of broader terms such as "comprises," "includes," and "having" should be understood to provide support for narrower terms such as "consisting of," "consisting essentially of," and "comprised substantially of." Use of the terms "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system, or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A powered air purifying respirator (PAPR) connector comprising:
    a tab extending from the PAPR connector, wherein the tab is positioned to contact an inner surface of a housing; and
    a flange extending from the PAPR connector, wherein the flange is configured to receive an attachment mechanism, wherein the attachment mechanism is configured to attach the PAPR connector to the housing;
    wherein the tab of the PAPR connector is configured to be rotatable within the housing for securing the PAPR connector to the housing and the attachment mechanism comprises a screw, a rod, or a bolt.

2. The PAPR connector of claim 1, further comprising a groove extending about a circumference of the PAPR connector.

3. The PAPR connector of claim 2, further comprising a gasket positioned within the groove.

4. The PAPR connector of claim 1, wherein the attachment mechanism is positioned within the flange and a receptacle of the housing.

5. The PAPR connector of claim 4, wherein the gasket comprises an O-ring.

6. The PAPR connector of claim 3, wherein the PAPR connector is attachable to a flow line.

7. The PAPR connector of claim 1, wherein the PAPR connector is rotatable from 45° through 90°.

8. The PAPR connector of claim 1, wherein the PAPR connector is hollow.

9. The PAPR connector of claim 1, wherein the housing comprises a PAPR blower.

10. A powered air purifying respirator (PAPR) system comprising:
    a housing comprising a PAPR blower and a connector mount; and
    a PAPR connector comprising:
        a tab extending from the PAPR connector, wherein the tab is positioned to contact an inner surface of the PAPR blower; and
        a flange extending from the PAPR connector, wherein the flange is configured to receive an attachment mechanism, wherein the attachment mechanism is configured to attach the PAPR connector to the housing;
    wherein the tab of the PAPR connector is configured to be rotatable within the PAPR blower for securing the PAPR connector to the PAPR blower and the attachment mechanism comprises a screw, a rod, or a bolt.

11. The PAPR system of claim 10, further comprising a groove extending about a circumference of the PAPR connector.

12. The PAPR system of claim 11, further comprising a gasket positioned within the groove.

13. The PAPR system of claim 10, wherein the attachment mechanism is positioned within the flange and a receptacle of the housing.

14. The PAPR system of claim 13, wherein the PAPR connector is rotatable from 45° through 90°.

15. The PAPR system of claim 14, further comprising a flow line, wherein the flow line is connected to the PAPR connector.

* * * * *